L. G. WALKER.
DRAW BAR COUPLING.
APPLICATION FILED DEC. 24, 1917.
1,335,211.  Patented Mar. 30, 1920.
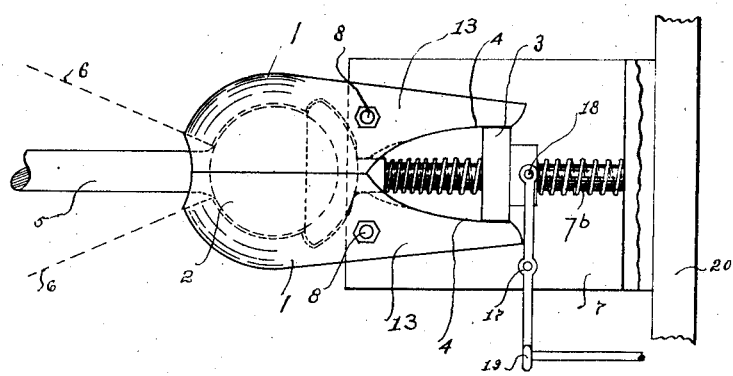
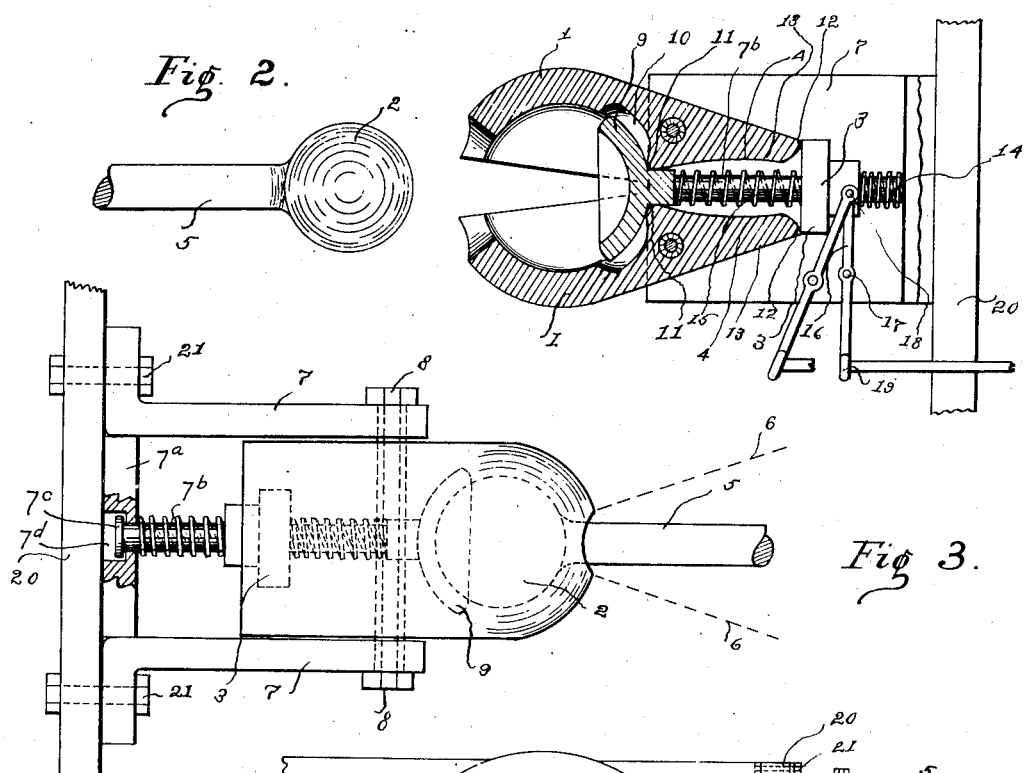
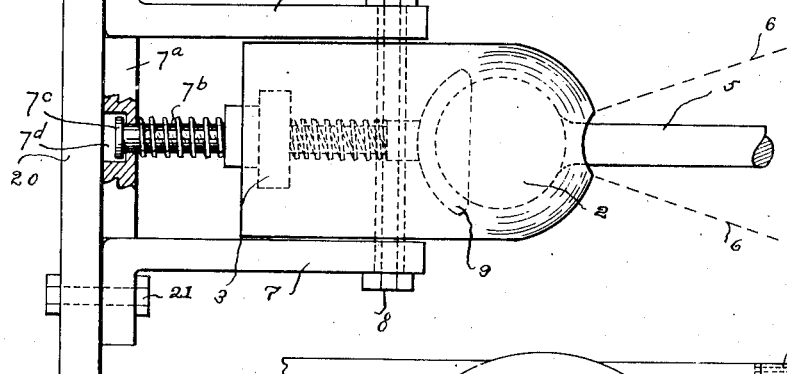
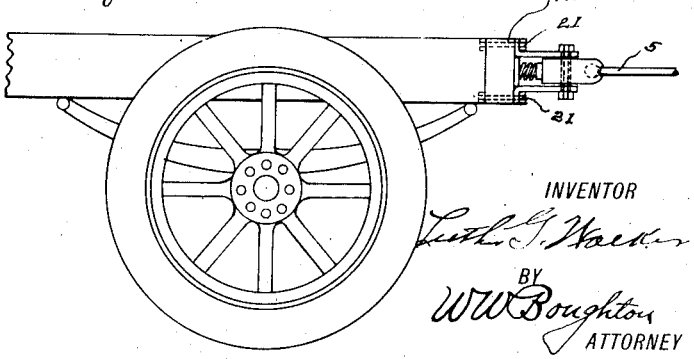
WITNESSES:  INVENTOR
  BY
  ATTORNEY

UNITED STATES PATENT OFFICE.

LUTHER G. WALKER, OF PUEBLO, COLORADO.

DRAW-BAR COUPLING.

1,335,211.  Specification of Letters Patent.  Patented Mar. 30, 1920.

Application filed December 24, 1917. Serial No. 208,537.

*To all whom it may concern:*

Be it known that I, LUTHER G. WALKER, a citizen of the United States, and a resident of Pueblo, in the county of Pueblo and State of Colorado, have invented a certain new and useful Improvement in Draw-Bar Couplings, of which the following is a full, clear, and exact description.

My invention is an improvement in draw bar couplers and relates to a device of that character particularly adapted for use on automobiles, trucks and other road vehicles, and mine cars. The principal objects of the invention are the provision of a draw bar coupler which shall be capable of permitting universal movement (within the requisite limits) between the draw bar and its socket, which shall be capable of automatic closing of its jaws to grasp the draw bar, and which will remain in locked position until manually operated to free the draw bar. Other and more particular objects and advantages of my invention will later appear from this specification.

In the single sheet of drawings accompanying this application and forming a part hereof—

Figure 1 is a plan view of my coupler as attached to the rear frame member of an automobile and showing the coupler in closed position grasping the end of a draw bar;

Fig. 2 is a partial plan view and partial horizontal section through my device in open or uncoupled position and showing the draw bar removed from the coupler jaws;

Fig. 3 is a side elevation of my device attached to the rear frame member of an automobile; and Fig. 4 is a partial side view of the rear of an automobile or truck showing, on a reduced scale, the location of my device thereon.

Referring now to the drawings, in which like characters of reference designate like parts in the several views, let 1 indicate a pair of coöperative jaws, each mounted on a vertical pivot pin 8 and recessed to conjointly form a socket of preferably spherical form. These jaws are adapted to receive and inclose the spherical head 2 of a coupling member 5 and each jaw is provided with an extension or wing 13 which projects forward beyond the pivot pin of the jaw. The wings have opposed contact faces which when the jaws are closed upon a coupling member placed between them, extend convergingly with relation to each other. The lips of the jaws 1 are cut away as shown in the drawings so as to provide for a freely swinging movement of the draw bar 5 in any direction between the limits indicated by the dotted lines 6.

The jaws 1 are mounted between a pair of horizontal plates 7, the pivot pins 8 passing through the jaws and the plates 7 and being secured in place by nuts or the like. The plates 7 are preferably provided with flanges at right angles thereto through which may be passed bolts 21 for securing the plates to the frame member 20 of the towing vehicle and the plates 7 are preferably held the proper distance apart by the spacing plates 7ª. A shaft 7ᵇ having a head 7ᶜ projects through the plate 7ª and has a limited movement in a longitudinal direction due to the recess 7ᵈ in the plate 7ª in which its head is received. At its opposite extremity the shaft 7ᵇ carries rigidly secured thereto the head 9 which has an exposed abutment face spherically hollowed out on substantially the same radius as the inner face of the jaws 1. Behind the head 9 the jaws 1 are recessed at 10 in a degree sufficient to receive the head 9 when the jaws are closed, as indicated by the dotted lines in Figs. 1 and 3. The recesses 10 terminate in shoulders 11 which, as shown in Fig. 2, are in the path of the head 9 when the jaws are open but coincide with its rear curvature when the jaws are closed.

Mounted to move longitudinally with relation to the shaft is a locking member 3 which when the jaws are open is yieldingly held in frictional engagement with the ends of their wings by a spring 14 compressed between the member and a shoulder on the frame of the draw head.

The member is preferably of annular from and slidably mounted on the shaft and it is adapted to engage and move longitudinally of the faces of the wings on the jaws when by the impact of a coupling member entering the space between the jaws, upon the abutment head 9, the jaws are caused to move about their pivots and separate the ends of their respective wings from the coupling member with which they were in contact. A weaker spring 15 is mounted on the shaft between the locking ring 3 and the head 9. A lever 16, pivoted on a pin 17 carried by the plates 7, is connected at 18 to the locking ring 3 and at its opposite end to an operating lever 19 which may be extended forwardly to a position convenient for operation by the vehicle driver.

*Operation.*

Assuming the parts to be in the position shown in Fig. 2, if the draw bar head 2 is forced into its socket it will first contact with the head 9. Reaction of the latter against the shoulders 11 will swing the jaws 1 about their pivots 8, closing their rear or socket portions and spreading the wings 13. Under the action of the stronger spring 14 (once the extreme points of the wings are cleared) the locking ring 3 will enter between the wing ends 12, pass along their cam surfaces, thus aiding in the closing action and finally engage the substantially parallel but slightly diverging surfaces 4 of the wings. In this position the jaws will be closed around the draw bar head and they will be firmly locked and wedged in such position until the ring 3 is retracted.

By reason of the converging position of the faces on the inner sides of the wings on the jaws the locking ring urged by its constantly compressed spring tends to separate the wings and thereby close the jaws upon the coupling member placed between them. Any play between the parts, resulting from wear is thus immediately taken up and the coupling head will always fit snugly within its socket on the draw head.

When it is desired to uncouple the draw bar a pushing action on the rod 19 will retract the ring 3 against the action of the spring 14, free the ring from the wings 13 and permit either the bar to be withdrawn from its socket or the socket to be drawn off the bar; thus the coupler is left in position for re-coupling.

The combined action of the springs 14 and 15 tends always to hold the head 9 against the head 2 and thus prevent rattling.

Having thus described my invention, what I claim and desire to secure by Letters Patent is:—

1. In a coupler, a pair of pivoted jaws, wings formed as a continuation of said jaws beyond their pivot points, a shaft, a head on said shaft within said jaws, and a spring-urged locking-member mounted to slide along said shaft between and in engagement with said wings.

2. In a coupler, a pair of pivoted jaws, wings formed as a continuation of said jaws beyond their pivot points, a shaft, a head on said shaft within said jaws, a spring-urged locking-member mounted to slide along said shaft between and in engagement with said wings, and means for retracting said member against the action of its spring.

3. In a coupler, a frame, a pair of jaws pivoted in said frame, an operating wing formed as an extension of each jaw beyond the pivot point thereof, a shaft extending between said wings and having a limited longitudinal movement in said frame, a head rigidly mounted on said shaft and located between said jaws, and a locking ring slidably mounted on said shaft in operative relation to said wings.

4. In a coupler, a frame, a pair of jaws pivoted in said frame, an operating wing formed as an extension of each jaw beyond the pivot point thereof, a shaft extending between said wings and having a limited longitudinal movement in said frame, a head rigidly mounted on said shaft and located between said jaws, a locking ring slidably mounted on said shaft in operative relation to said wings, a compression spring on said shaft between said ring and said frame, and manually operable means for retracting said ring against the action of said spring.

5. In a coupler, a frame, a pair of jaws pivoted in said frame, an operating wing formed as an extension of each jaw beyond the pivot point thereof, a shaft extending between said wings and having a limited longitudinal movement in said frame, a head rigidly mounted on said shaft and located between said jaws, a locking ring slidably mounted on said shaft in operative relation to said wings, a compression spring mounted on said shaft between said head and said ring, and a stronger compression spring on said shaft between said ring and said frame.

6. In a coupler, a frame, a pair of recessed jaws pivoted in said frame, an operating wing formed as an extension of each jaw beyond the pivot point thereof, a shaft extending between said wings and having a limited longitudinal movement in said frame, a head rigidly mounted on said shaft and located between said jaws, said head being adapted to be received within the recesses in said jaws when the jaws are closed, shoulders on said jaws lying in the path of said head when said jaws are open but conforming to the inner curvature of the recesses when said jaws are closed, a locking ring slidably mounted on said shaft in operative relation to said wings, a spring tending to force said ring between said wings, and means for retracting said ring against the action of said spring.

7. A coupling comprising coöperative jaws pivoted to open or close together and having wing-extensions, a shaft between the extensions having a limited longitudinal movement, a head on the shaft disposed to be engaged by a coupling-member entering the space between the jaws and engaging the jaws to effect their pivotal closing movement, and a spring-urged locking-member engaging the ends of the extensions when the jaws are open and slidably mounted on the shaft to move between the extensions when the jaws close upon a coupling-member placed between them.

8. In a coupling, coöperative jaws pivoted to open or close together and recessed to present conjointly a socket of substantially circular section, and a sliding abutment disposed to be engaged by a coupling-member entering the space between the jaws and engaging the jaws to effect their pivotal closing movement, the jaws having depressions to admit the abutment so as to form a continuation of the surface of the socket when the jaws are in the closed position.

9. In a coupling, coöperative jaws pivoted to open or close together, a movable abutment engaging the jaws in their open position to force them together by the impact of a coupling-member, and a coupling-member having a head to enter the space between the jaws, the jaws and the abutment being formed to conjointly provide a socket which snugly fits the head when the jaws are closed.

10. In a coupling, coöperative jaws pivoted to open or close together, a movable abutment engaging the jaws in their open position to force them together by the impact of a coupling-member and a coupling member having a substantially spherical head to enter the space between the jaws, the jaws and the abutment being formed to conjointly provide a socket which snugly fits the head when the jaws are closed.

In testimony whereof I have hereunto affixed my signature.

LUTHER G. WALKER.